F. O. WOODLAND.
SHOCK ABSORBER.
APPLICATION FILED OCT. 6, 1910.
1,058,128.
Patented Apr. 8, 1913.
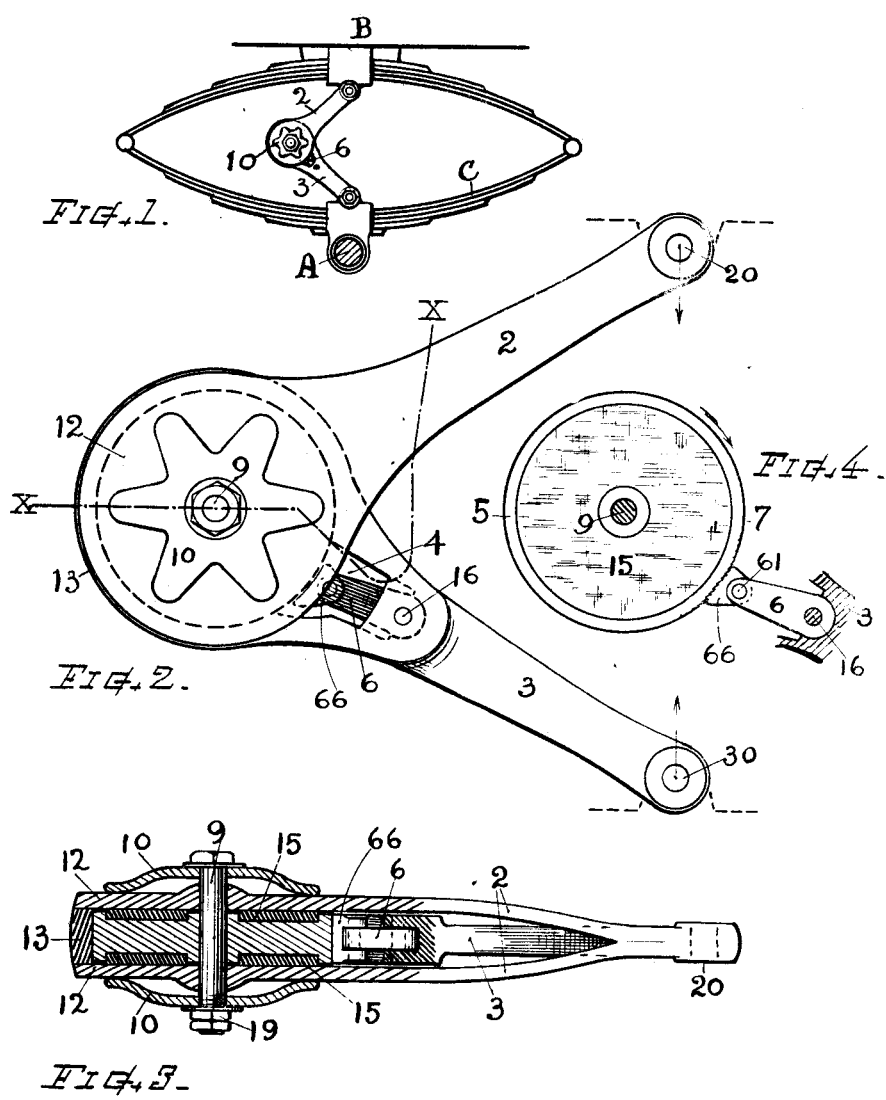

UNITED STATES PATENT OFFICE.

FRANK O. WOODLAND, OF WORCESTER, MASSACHUSETTS.

SHOCK-ABSORBER.

1,058,128.   Specification of Letters Patent.   Patented Apr. 8, 1913.

Application filed October 6, 1910. Serial No. 585,620.

*To all whom it may concern:*

Be it known that I, FRANK O. WOODLAND, a citizen of the United States, residing at Worcester, in the county of Worcester and State of Massachusetts, have invented a new and useful Shock-Absorber, of which the following is a specification, reference being made therein to the accompanying drawings.

The object of my present invention is to provide a simple, novel and efficient shock-absorbing appliance for employment in conjunction with the springs of automobiles, or other vehicles; said appliance comprising a pair of attaching arms or levers, and a resistance element, combined and adapted for operating substantially as hereinafter explained. Also to provide such an appliance with convenient means for regulating the amount of shock-absorbing resistance afforded thereby. I attain these objects by the mechanism illustrated in the accompanying drawings, wherein—

Figure 1 represents a side view of my invention as in connection with a vehicle spring. Fig. 2 is a side view of my shock-absorber appliance on larger scale. Fig. 3 is a cross section at line X X on Fig. 2, and Fig. 4 is a side view of the resistance disk and pawl separate from other parts.

Referring to the several parts on Fig. 1, the letter A indicates the vehicle axle; B the body; and C the spring; which may be parts of any automobile or other vehicle, and of any form, upon which it is desired to employ the shock-absorber appliance.

In accordance with my invention the illustrated improved mechanism comprises a pair of hingedly connected arms or levers 2 and 3 provided with circular head portions, and a frictional-resistance element, or disk 5, that is disposed at the junction of said arm; one of the arms (2) embracing the side faces of the disk, while the other arm (3) is provided with a pawl 6 that engages or acts against the peripheral edge 7 of the disk 5 for effecting rotation thereof, taking hold thereon by movement of the pawl-carrier arm in one direction (see arrow on Fig. 4) and releasing its hold when the movement is in the other direction.

The arm or lever 2 is preferably made dual or bifurcated, its two cheek portions 12 having inner frictional surfaces that embrace the opposite side faces of the disk. The peripheral edge or cylindrical face of the resistance disk 5 is of approximately the same or but slightly less width than the space between the two cheek portions 12. (See Fig. 3.)

A center pivot or axis-bolt 9 extends through the disk and side members 12 of the lever 2, and suitable springs or cup-shaped washers 10 are arranged upon said bolt beneath its head and nut 19, or one of them; said springs bearing upon the outside cheeks of the arm 2 for pressing the same against the friction faces of the disk. Said friction faces are best provided with annular pads or plates 15 of vulcanite fabric, paper, leather or other equivalent approved frictional material for sustaining frictional resistance, and wear, between the adjacent contact surfaces. The annular plates 15 are preferably disposed in recesses which may be formed either in the disk or cheek-member. By means of the center bolt 9 and its nuts 19 the degree of frictional resistance can be regulated as desired, to give greater or less shock-absorbing effect.

The lever or arm 3 has a cylindrical loop-shaped head 13 that surrounds and incloses the periphery of the disk 5, preferably filling the space laterally between the two cheeks of the arm 2, while the pawl 6 is arranged within a recess 4 formed in said arm, and is pivoted therein at 16. The engaging end 66 of the pawl is preferably hinged to its body, as at 61. The pawl is adapted to grip the peripheral face of the disk when the arms 2 and 3 swing apart; and to release the disk from the frictional clutch of the arm 3, when the arms approach or swing toward each other. The pawl 6 and periphery of the disk may have smooth adjacent faces to clutch by frictional grip; or their faces may be provided with small teeth or corrugations to give a more positive grip, as in any instance preferred.

The arms are provided, at their outer ends, with bolt-holes 20 and 30, or other approved means, for their pivotal attachment, respectively at upper and under positions in relation to the spring C upon the vehicle, whereon the shock-absorber is employed, substantially as indicated in Fig. 1.

In the operation: When under compression, the arms or levers 2 and 3 approach each other, the disk 5 moves freely within the arm 3 and swings with the arm 2; but when the arms separate or swing apart, the disk 5 is automatically clutched to the arm 3 by the pawl 6, and then the disk moves with said arm 3; consequently the movement is resisted by the friction of the sides or friction-plates 15 of the disk against the cheek members of the bifurcated lever or arm 2, thereby resisting or absorbing the shock, due to the rebounding of the spring C, in a very efficient manner. In the action the disk 5 rotates in one direction only, it being controlled alternately by the arm 2, and then by the pawl and arm 3. Hence the wear on all frictional parts will be uniform, and the action smooth and efficient.

This mechanism is comparatively simple and inexpensive, and can readily be attached to automobiles or other vehicles now in use, or to new machines, at small cost and with satisfactory results.

I claim—

1. In a shock absorber, in combination as described, with a pair of hingingly connected arms or levers, one of said levers being dual or bifurcated and having opposite frictional cheek portions, an axis-pivot therethrough, a rotatable friction disk mounted on said axis-pivot and laterally embraced between the frictional cheek portions of said bifurcated lever, the other lever having a cylindrical head that surrounds, fits and incloses the periphery of said friction disk, said lever carrying a swinging pawl hingingly seated within a socket recess in the lever arm, and said pawl being provided with a hinged head member and adapted to act against the peripheral face of the disk by knuckle joint action for engagement therewith in one direction of movement, and means including the oppositely pressing cheek-springs for regulating the resistance tension against the sides of the disk.

2. In a shock-absorber, the combination of a bifurcated arm having cheek members with frictional surfaces thereon, a revoluble friction-disk disposed between and counter-matching said cheek-members, a pivot or axis-bolt therethrough, a second arm having its head surrounding said disk and approximately fitting the space between said cheek members, a hinged pawl carried by said second arm and engaging the periphery of the disk for rotating it in one direction, said pawl having a hinged engaging end for contact with the face of the disk, a spring supported on the axis-bolt for pressing the cheek-member toward the disk, and contact-plates of frictional material between the adjacent faces of the disk and cheek-members, the outer ends of said arms adapted for pivotally attaching means.

Witness my hand this 4th day of October 1910.

FRANK O. WOODLAND.

Witnesses:
CHAS. H. BURLEIGH,
FRANK A. DRURY.